US006320873B1

(12) United States Patent
Nevo et al.

(10) Patent No.: US 6,320,873 B1
(45) Date of Patent: Nov. 20, 2001

(54) CDMA TRANSMISSION OF PACKET-SWITCHED DATA

(75) Inventors: Ron Nevo, Mitzpe Aviv; Michael Vakulenko; Sergio Kolor, both of Haifa; Shlomo Nizri, Kibutz Hasolelim; Ilan Kessler, Haifa; Atai Levy, Haifa; Dror Shindelman, Haifa, all of (IL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/141,266

(22) Filed: Aug. 27, 1998

(51) Int. Cl.[7] .................................................... H04Q 7/22
(52) U.S. Cl. .......................... 370/466; 370/335; 370/338
(58) Field of Search .................................... 370/230, 320, 370/335, 342, 441, 479, 352–356, 338, 349, 465, 466, 467, 475

(56) References Cited

U.S. PATENT DOCUMENTS

| 5,101,501 | 3/1992 | Gilhousen et al. ...................... 455/33 |
| 5,239,294 | 8/1993 | Flanders et al. ................. 340/825.34 |
| 5,309,501 | 5/1994 | Kozik et al. ............................. 379/58 |
| 5,329,573 | 7/1994 | Chang et al. ............................ 379/58 |
| 5,396,543 | 3/1995 | Beeson, Jr. et al. .................... 379/59 |
| 5,412,375 | 5/1995 | Wood ............................... 340/825.03 |
| 5,640,386 | 6/1997 | Wiedman ............................... 370/320 |
| 5,664,004 | 9/1997 | Durchman et al. .................. 455/466 |
| 5,793,744 | * 8/1998 | Kanerva et al. ..................... 370/209 |
| 5,963,548 | * 10/1999 | Virtanen ............................... 370/335 |
| 5,963,860 | * 10/1999 | Muths et al. ......................... 455/412 |
| 5,987,137 | * 11/1999 | Karppanen et al. ................... 380/28 |
| 6,041,048 | * 3/2000 | Erickson et al. ..................... 370/349 |

FOREIGN PATENT DOCUMENTS

| 9524771 | 2/1995 | (WO) . |
| 9921289 | 4/1999 | (WO) .............................. H04B/1/38 |
| 9922470 | 5/1999 | (WO) .............................. H04B/7/26 |
| 9430022 | 12/1994 | (WO) .............................. H04Q/7/04 |
| 9621999 | 1/1996 | (WO) .............................. H04Q/7/22 |
| 9723108 | 6/1997 | (WO) .............................. H04Q/7/30 |

OTHER PUBLICATIONS

Melanchuk, et al., "CDPD and Emerging Digital Cellular Systems" 1996 IEEE, pp. 2–8.

"The GSM System for Mobile Communications", Michel Mouly and MarieBernadette Pautet; *GSM System for Mobile Communications*; FR., Lassay–les, Chateaux, Europe Media, 1993.

"A Subscriber Signalling Gateway Between CDMA Mobile Station and GSM Mobile Switching Center"; Yeonghwan Tscha, Gakjin Choi, Kyoon Ha Lee; Research Institute of Advanced Computer Technology, Seoul Natl. Univ., Seoul, Korea; pp. 181–185.

"Design of a Protocol Controller for Wireless Information Networks"; Kanti Prasad, Kuen–Wing Poon; Electrical Engineering Dept., Univ. of Massachusetts, Lowell, MA; pp. 519–524.

"GSM Protocol Architecture: Radio Sub–System Signalling"; Marie–Bernadette Pautet, France Telecom, and Michel Mouly, Matra Communication ; 1991 IEEE; pp. 326–332.

"North American Cellular CDMA"; 1266 Hewlett Packard Journal Dec. 1993, No. 6; Palo Alto, CA, USA; pp. 90–97.

* cited by examiner

*Primary Examiner*—Chau Nguyen
*Assistant Examiner*—Jasper Kwoh
(74) *Attorney, Agent, or Firm*—Philip Wadsworth; Charles D. Brown; Bruce W. Greenhaus

(57) ABSTRACT

A method for conveying packet data from a CDMA mobile station to a GSM network, including communicating with a GSM service node to establish a data link from the mobile station to the network via a radio communications base station. The packet data are conveyed between the mobile station and the base station over a CDMA air interface and are then transferred over the link between the base station and the network.

14 Claims, 6 Drawing Sheets

FIG. 2B

MS 40
| IP/X.25 |
| SNDCP |
| GPRS LLC |
| GSM-CDMA RLC/MAC |
| CDMA LAYER 1 |

*Gm*

BSS 32
| Relay | BSSGP |
| | NETWORK SERVICE |
| | L1 bis |
| GSM-CDMA RLC/MAC | |
| CDMA LAYER 1 | |

*Gb*

SCSN 52
| Relay | GTP |
| | TCP/UDP |
| | IP |
| | L2 |
| | L1 |
| SNDCP | |
| GPRS LLC | |
| BSSGP | |
| NETWORK SERVICE | |
| L1 bis | |

*Gn*

GGSN 54
| Relay |
| GTP |
| TCP/UDP |
| IP |
| L2 |
| L1 |

CDMA TRANSMISSION OF PACKET-SWITCHED DATA

FIELD OF THE INVENTION

The present invention relates generally to wireless telecommunications, and specifically to data transmission over advanced cellular communications networks.

BACKGROUND OF THE INVENTION

The Global System for Mobile (GSM) telecommunications is used in cellular telephone networks in many countries around the world. GSM offers a useful range of network services and standards, including facilities for data, as well as voice, transmission. Existing GSM networks are based on time-division multiple access (TDMA) digital communications technology.

Code-division multiple access (CDMA) is an improved digital communications technology, which affords more efficient use of radio bandwidth than TDMA, as well as a more reliable, fade-free link between cellular telephone subscribers and base stations. The leading CDMA standard is IS-95, promulgated by the Telecommunications Industry Association (TIA).

PCT patent application PCT/US96/20764, which is incorporated herein by reference, describes a wireless telecommunications system that uses a CDMA air interface (i.e., basic RF communications protocols) to implement GSM network services and protocols. Using this system, at least some of the TDMA base stations (BSSs) and subscriber units of an existing GSM network would be replaced or supplemented by corresponding CDMA equipment. CDMA BSSs in this system are adapted to communicate with GSM mobile switching centers (MSCs) via a standard GSM A-interface. The core of GSM network services is thus maintained, and the changeover from TDMA to CDMA is transparent to users.

Hybrid cellular communications networks, incorporating both GSM and CDMA elements, are also described in PCT patent publications WO 95/24771 and WO 96/21999, and in an article by Tscha, et al., entitled "A Subscriber Signaling Gateway between CDMA Mobile Station and GSM Mobile Switching Center," in Proceedings of the 2nd International Conference on Universal Personal Communications, Ottawa (1993), pp. 181–185, which are incorporated herein by reference. None of these publications deals with specific issues of data communications. Such issues include both the need for protocol compatibility and the different demands of voice and data communications. Although TIA has promulgated standards of CDMA over-the-air data transmission, such as IS-657 and IS-707, the GSM BSS-MSC interface is not suited to support such transmission.

Generally speaking, because GSM was developed primarily for circuit-switched transmission, it is not well suited for packet-switched data, as is commonly transmitted over the Internet. For this reason, the European Telecommunications Standards Institute (ETSI) has proposed a general packet data service (GPRS) to operate in conjunction with GSM cellular networks. GPRS is described in a number of GSM standards, including 02.60, 03.60 and 03.64, which are incorporated herein by reference.

When a subscriber unit (or mobile station—MS) in a GSM network with GPRS wishes to send and/or receive packet-switched data, the MS through the BSS with which it is in communication makes contact with a "serving GPRS support node" (SGSN), over a GSM-standard Gb interface. The data are transmitted and received by the BSS through the SGSN, separately from the voice channels that go through the MSC, to a packet data network (PDN), such as the Internet. The SGSN likewise maintains its own separate mobility management and security facilities. Unlike GSM-TDMA voice communications, GPRS allows dynamic time slot allocation in the air interface between the subscriber units and the SGSN.

SUMMARY OF THE INVENTION

It is an object of the present invention to provide methods and apparatus for conveying packet-switched data through a cellular communications network.

In some aspects of the present invention, the data are conveyed over a CDMA air interface.

In other aspects of the present invention, the data are conveyed in the network in accordance with GSM standards, and particularly with the proposed GPRS standard.

In preferred embodiments of the present invention, a mixed GSM/CDMA cellular communications system includes one or more CDMA base stations (BSSs), controlled by a GSM mobile switching center (MSC). Systems of this type are described in a U.S. patent application entitled "Base Station Handover in a Hybrid GSM/CDMA Network," filed Jul. 20, 1998, which is assigned to the assignee of the present patent application and is incorporated herein by reference. A subscriber unit in the system, referred to herein as a mobile station (MS), which is in communication with one of the CDMA BSSs over a CDMA air interface, transmits and receives packet-switched data through the system via the CDMA BSS. The MS and the CDMA BSS are adapted to operate substantially in accordance with GSM data networking and signaling protocols. The data transmitted and received by the MS preferably include Internet protocol (IP) data, but other types of data may similarly be conveyed. The term "data" as used in the context of the present patent application and in the claims refers to substantially all types of data that are typically conveyed through packet-switched networks, which may even include voice transmission, as is known in the art.

In some preferred embodiments of the present invention, the system includes a GPRS network, with which the CDMA BSS communicates, in accordance with GPRS data networking and signaling standards. Preferably, the CDMA BSS and MS communicate with a SGSN associated with the GPRS network via a standard GSM/GPRS Gb interface. Signaling and data transmission over a CDMA Um interface between the MS and BSS are adapted to support GSM/GPRS protocols operating over the Gb interface, which is substantially unmodified.

In other preferred embodiments of the present invention, the CDMA BSS has a direct interface to a packet-switching network, such as the Internet. A network service node, preferably a service control point (SCP) functioning as a operator-specific service (OSS) node, is coupled between the GSM MSC and the CDMA BSS. The MSC controls services such as authentication, ciphering and billing, preferably through the SCP using a OSS interface, for example, the CAMEL (customized applications for mobile network enhanced logic) interface as has been proposed by ETSI.

There is therefore provided, in accordance with a preferred embodiment of the present invention, a method for conveying packet data between a mobile station and a GSM network, including:

communicating with a GSM service node to establish a data link between the mobile station and the network via a radio communications base station;

conveying the packet data between the mobile station and the base station over a CDMA air interface; and transferring the data over the link between the base station and the network.

Preferably, communicating with the node includes communicating with a GPRS node, and transferring the data includes transferring the data via the GPRS node, wherein communicating with the GPRS node includes communicating with a SGSN via a GSM Gb interface. Further preferably, conveying the data includes mapping GPRS frames onto the CDMA air interface, wherein mapping the GPRS data frames includes using a CDMA radio link control to support a GPRS logical link control.

In a preferred embodiment, transferring the data includes transferring data as a GSM operator-specific service, wherein communicating with the node includes communicating with a GSM service control point, which communicates with a switching center via a GSM operator-specific service interface. Preferably, the mobile station communicates with a home location register via a GSM unstructured supplementary service data interface. Alternatively, the service control point communicates with a switching center via a GSM customized applications for mobile network enhanced logic interface.

Preferably, the method includes handing over the mobile station from the base station to another base station, wherein transferring the data over the link includes routing data to the other base station using Mobile IP.

Preferably, communicating with the service node includes communicating with a switching center via a GSM A-interface.

In a preferred embodiment, transferring the data includes transferring data directly between the base station and the network, substantially without passing the data through the service node.

Preferably, communicating with the service node includes providing GSM authentication of the mobile station for a call made over the CDMA air interface.

Further preferably, conveying the data includes conveying data over a CDMA air interface based substantially on an IS-95 interface standard.

In a preferred embodiment, conveying the data includes conveying data at a variable rate, responsive to a data volume to be conveyed over the air interface, wherein conveying the data preferably includes opening a fundamental channel for conveying the data and signaling thereover, and responsive to the data volume opening one or more supplemental channels between the mobile station and the base station to carry the data. Preferably, opening the supplemental channels includes opening a different number of channels in forward and reverse directions between the mobile station and the base station. Alternatively or additionally, one or more of the supplemental channels are closed in response to a decrease in the data rate.

Preferably, conveying the data includes conveying data using IS-657 and IS-707 CDMA packet data service.

There is further provided, in accordance with a preferred embodiment of the present invention, wireless communications apparatus, for use in a mobile telecommunications system, including:

a mobile station, which is coupled to exchange data with terminal equipment, and which initiates a call to convey the data over a CDMA air interface; and a base station, which communicates with a GSM network service node to establish a data link responsive to the call initiated by the mobile station, and which conveys the data between the mobile station and the network over the data link.

Preferably, the service node includes a GPRS node, and wherein the base station transfers the data via the GPRS node using a GPRS communications protocol, wherein the GPRS node includes a SGSN, with which the base station communicates via a GSM Gb interface.

In a preferred embodiment, the data are transferred over the data link as a GSM operator-specific service, wherein the GSM network node preferably includes a GSM service control point, which communicates with a switching center via an operator-specific service interface. Alternatively, the mobile station communicates with a home location register via a GSM unstructured supplementary service data interface. Further alternatively, the service control point communicates with a switching center via a GSM customized applications for mobile network enhanced logic interface. Preferably, the data link includes a direct connection between the base station and the network, wherein the data are transferred over the direct connection substantially without passing through the service node.

Preferably, the air interface is based substantially on an IS-95 CDMA air interface standard, and the air interface operates substantially in accordance with IS-657 and IS-707 CDMA packet data service.

The present invention will be more fully understood from the following detailed description of the preferred embodiments thereof, taken together with the drawings in which:

BRIEF DESCRIPTION OF THE DRAWINGS

FIGS. 2A and 2B are schematic block diagrams illustrating communications protocol stacks between elements of the system of FIG. 1, in accordance with a preferred embodiment of the present invention;

DETAILED DESCRIPTION OF PREFERRED EMBODIMENTS

Figure 1:
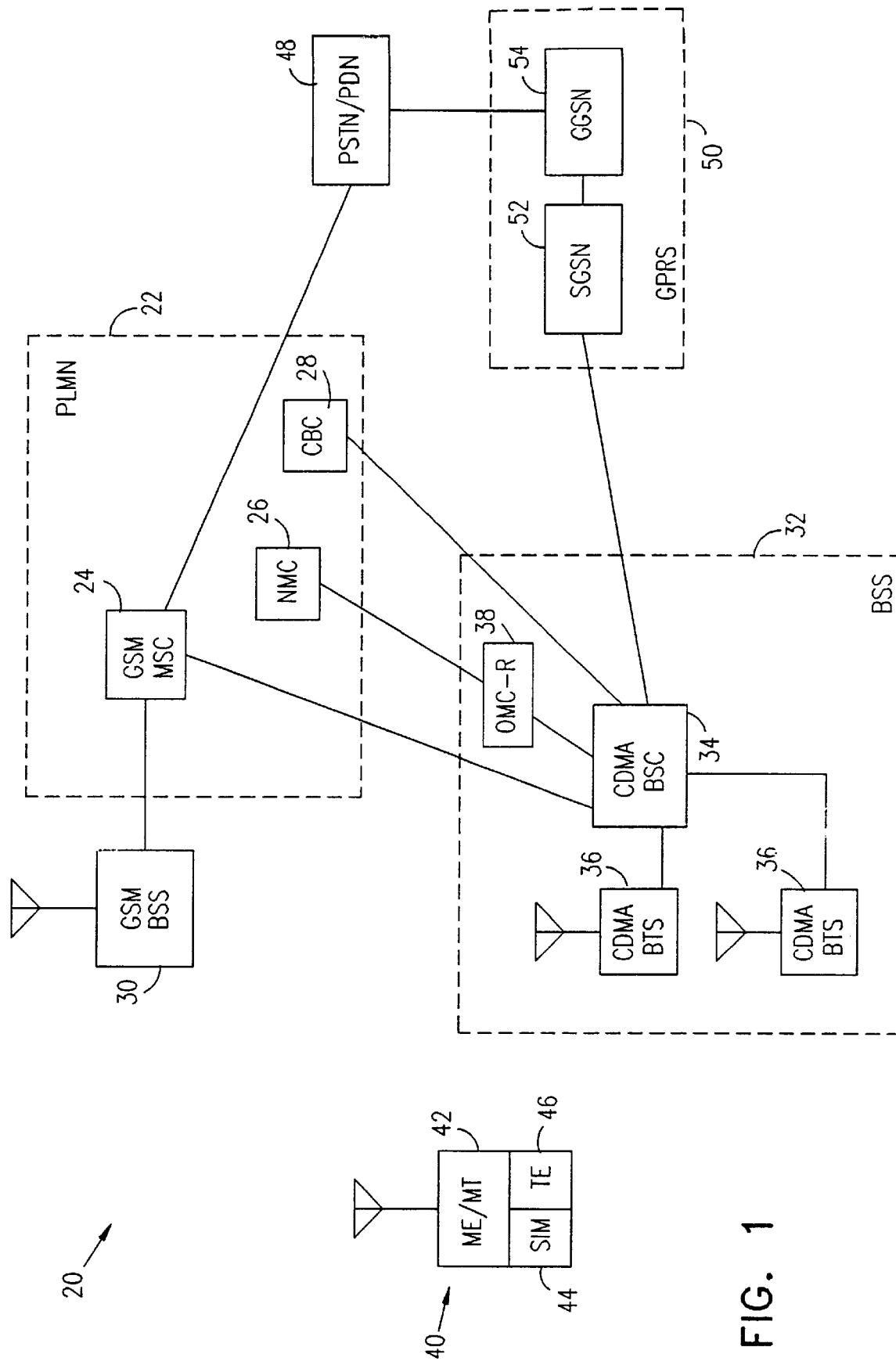
FIG. 1 is a schematic block diagram of a hybrid GSM/CDMA cellular communications system, in accordance with a preferred embodiment of the present invention.

Reference is now made to FIG. 1, which is a schematic block diagram of a hybrid GSM/CDMA cellular communications system 20, in accordance with a preferred embodiment of the present invention. System 20 is built around a public land mobile network (PLMN) 22, which is based on the GSM communications standard, as is known in the art and described briefly hereinabove. Infrastructure for such networks already exists and is in wide use in many countries, and the present invention has the advantage of enabling gradual introduction of CDMA service is conjunction with such a network without requiring major changes to the existing infrastructure.

PLMN 22 comprises at least one mobile-services switching center (MSC) 24, or possibly a number of such centers (although only one MSC is shown here for clarity of illustration), which controls network operations within a geographical area. Among other functions, MSC 24 is responsible for location registration of subscriber units and handover of subscriber units between base stations, as well as linking PLMN 22 to a public switched telephone network (PSTN) and/or packet data network (PDN) 48 for circuit-switched data. The PLMN also comprises a network management center (NMC) 26 and a cell broadcast center (CBC) 28. The functions of these elements, as well as other aspects of system 20 and details regarding a mobile station (MS) 40 in the system, are described further in the above-mentioned U.S. and PCT Patent Applications.

System 20 includes a plurality of MSs 40, which communicate with PLMN 22 via a plurality of base station subsystems (BSS) 30 and 32 over a wireless RF link at one or more of the accepted cellular communications frequencies. MS 40, which is also known as a subscriber unit, is preferably capable of communicating with both GSM BSS 30, using a standard GSM TDMA communication protocol, and CDMA BSS 32, using CDMA-based communication methods described hereinbelow. Although for the sake of clarity, only one each of MS 40, GSM BSS 30 and CDMA BSS 32 is shown in FIG. 1, it will be understood that in actuality, system 20 typically comprises a plurality of each of these system elements.

Both GSM BSS 30 and CDMA BSS 32 communicate with and are controlled by MSC 24, substantially in accordance with GSM standards, via the GSM standard A-interface. Signaling and data communications between BSS 32 and MSC 24 are further described in the above-mentioned U.S. Patent Application entitled "Base Station Handover in a Hybrid GSM/CDMA Network," and in another U.S. Patent Application, filed on even data, entitled "Transmission of GSM Circuit-Switched Data over a CDMA Link." These applications are assigned to the assignee of the present patent application and are incorporated herein by reference.

BSS 32 is also linked to a general packet data service (GPRS) network 50, as has been proposed by the European Telecommunications Standards Institute (ETSI). The GPRS includes a SGSN 52, which communicates in both signaling and data transmission planes with BSS 32. The SGSN effectively takes the place of MSC 24 when MS 40 asks to transmit or receive packet data via the BSS, rather than voice traffic. In accordance with GPRS standards, SGSN 52 communicates with PDN 48 via a "gateway GPRS serving node" (GGSN) 54. Communication protocols between MS 40, BSS 32 and SGSN 52 are described below with reference to FIGS. 2A and 2B.

Communications between CDMA BSS 32 and MS 40 are based on a CDMA radio "air interface," which is preferably based on the IS95 standard for CDMA communications, and most preferably on the TIA/EIA-95-B version of the standard. BSS 32 is built around a base station controller (BSC) 34, which controls and communicates with a number of base station transceivers (BTS) 36. Each BTS transmits RF signals to and receives RF signals from MS 40 when the MS is within a geographical area, or cell, served by the particular BTS. On the other hand, when MS 40 is within a cell served by GSM BSS 30, the MS preferably communicates with BSS 30 over a GSM/TDMA air interface. It will be understood, however, that the principles of the present invention apply generally to communication of data over the CDMA air interface between MS 40 and CDMA BSS 32 (and from there to SGSN 52); and it is not essential that MS 40 have the capability of TDMA communications with GSM BSS 30, as well.

In order to sustain both of these interfaces, MS 40 comprises mobile equipment (ME) 42, which preferably includes either two radio transceivers, one configured for TDMA operation and one for CDMA, or a single transceiver which can dynamically switch between TDMA and CDMA. The MS includes mobile termination (MT), which supports terminal equipment (TE) 46 for data input and output, including packet data. Preferably, TE 46 comprises a user terminal, such as a personal computer, which is coupled to input and output data via ME/MT 42. In addition, MS 40 comprises a subscriber identity module (SIM) 44, in accordance with GSM standards.

Figure 2A:
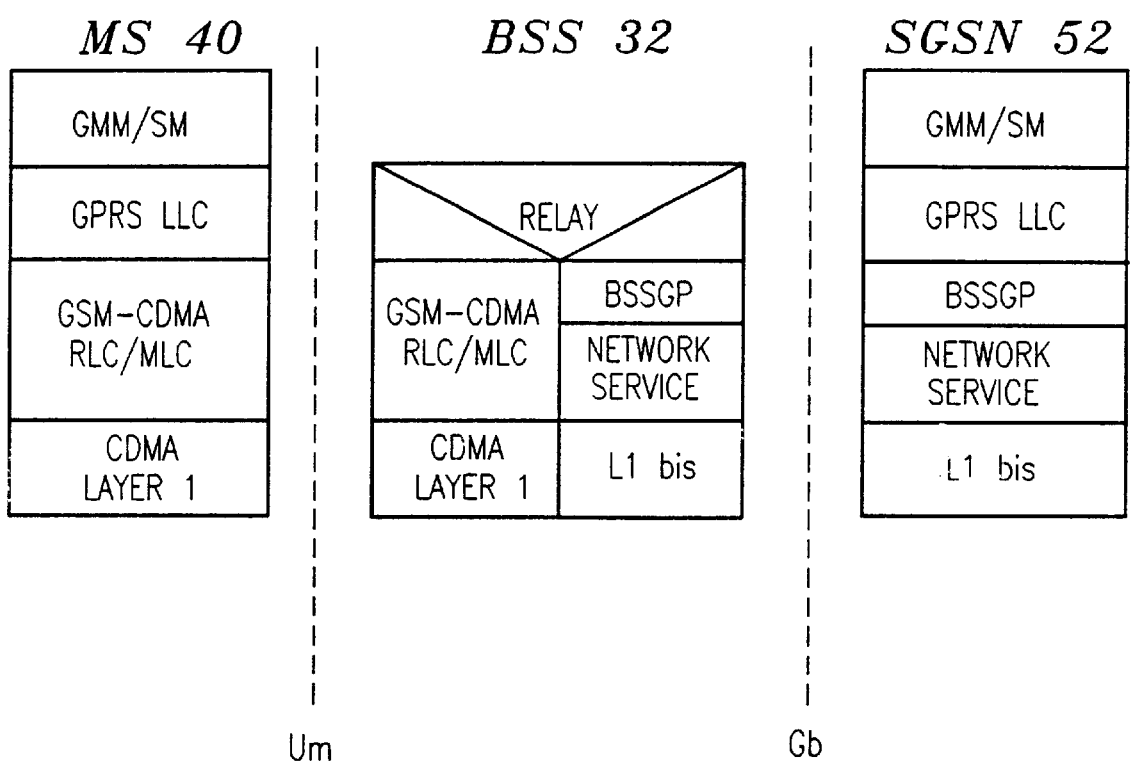

FIG. 2A is a block diagram that schematically illustrates protocol stacks used in signaling interfaces between MS 40, CDMA BSS 32 and SGSN 52, in accordance with a preferred embodiment of the present invention. These interfaces enable MS 40 to communicate with GSM SGSN 52 over a CDMA air interface between the MS and BSS 32. If and when MS 40 is in communication with SGSN 52 via GSM BSS 30, the protocol stacks are in accordance with GPRS standards, substantially without modification thereto.

Regardless of whether MS 40 is communicating via CDMA BSS 32 or GSM BSS 30, upper-level communications between MS 40 and SGSN 52 are preferably conducted using a logical link control (LLC) layer, as specified by GSM standard 04.64, which is incorporated herein by reference. This layer provides a reliable ciphered logical link, which is independent of the underlying CDMA or TDMA radio protocols, so that generally no changes, or only minimal changes, are required in GPRS 50 relative to the GSM standard. Similarly, mobility management functions are preferably supported by a GSM GPRS mobility management and session management (GMM/SM) protocol layer, in accordance with GSM standard 03.60, which is also incorporated herein by reference. This layer provides functions such as GPRS attach, GPRS detach, security, routing area update, location update and packet data protocol (PDP) context activation and de-activation, as described in the GSM standard.

MS 40 communicates with CDMA BSS 32 over a CDMA Um interface, based on the CDMA IS-95 air interface, which is modified to support GSM and GPRS signaling standards. The CDMA air interface between MS 40 and CDMA BSS 32 comprises CDMA Layer 1, which operates on a standard IS-95 protocol, and a GSM-CDMA radio link control (RLC), in which IS-95 operation is adapted to support the GPRS LLC and GMM/SM layers above it in the stack. The RLC layer includes a medium access control (MAC) function associated with the RLC layer, which controls access signaling (request and grant) for CDMA radio channels and mapping of GSM LLC data frames onto the CDMA physical channel. From the point of view of the GPRS LLC and GMM/SM layers above it, the GSM-CDMA RLC preferably emulates the GSM-TDMA RLC as specified in GSM standard 04.64, which is incorporated herein by reference. The upper layers (GPRS LLC and GMM/SM) are not processed by BSS 32, but are rather relayed through between MS 40 and SGSN 52 for processing in a manner substantially transparent to the CDMA air interface layers below.

CDMA BSS 32 communicates with SGSN 52 over a standard, substantially unmodified GSM/GPRS Gb interface. This interface preferably includes GSM L1 bis, network service and BSS GPRS protocol (BSSGP) layers. The network service and L1 bis layers are preferably defined in accordance with the GSM 08.16 standard, and the BSSGP layer is preferably defined in accordance with the GSM 08.18 standard, which standards are incorporated herein by reference. The BSSGP layer conveys routing and information related to quality of service (QoS) between BSS 32 (or BSS 30) and SGSN 52. The network service layer transports BSSGP packet data units (PDUs), based on the frame relay connection between the BSS and the SGSN, which may traverse a network of frame relay switching nodes. BSS 32 translates CDMA Layer 1 and GSM-CDMA RLC protocols exchanged between the BSS and MS 40 into appropriate L1 bis, network service and BSSGP protocols for transmission to SGSN 52, and vice versa.

Because CDMA BSC 34 communicates with SGSN 52 over the standard Gb interface, substantially no modifications are required in the core GPRS 50 in order to enable the addition of CDMA BSS 32 to the GPRS network. Furthermore, GPRS 50 need not be aware that there is any difference in identity between GSM/TDMA BSS 30 and CDMA BSS 32, since both communicate with SGSN 52 in a substantially identical manner over the Gb interface.

FIG. 2B is a block diagram that schematically illustrates protocol stacks involved in transmitting data between MS 40 and GGSN 54 via CDMA BSS 32 and SGSN 52, in accordance with a preferred embodiment of the present invention. ME/MT 42 exchanges data with TE 46 via any suitable physical interface and high-level networking protocol known in the art, for example, an Internet protocol (IP) or an X.25 protocol. The networking protocol is relayed through BSS 32, SGSN 52 and GGSN 54 to a corresponding host coupled to PDN 48.

Network level transmissions (such as IP and X.25) between MS 40 and a corresponding relay layer in SGSN 52 are supported by a sub-network dependent convergence protocol (SNDCP), preferably as specified by GSM standard 04.65, which is incorporated herein by reference. The SNDCP layer maps the upper, networking-level protocol onto the GPRS LLC layer, which is described hereinabove with reference to FIG. 2A. LLC data packets received by SGSN 52 from MS 40 are translated by the SGSN into TCP or UDP packets. TCP is generally used when a reliable data link, such as X.25, is required between MS 40 and GGSN 54; and UDP is used when such reliability is not required, as in IP transmission. TCP and UDP are well known in the art, and are respectively defined, for example, in RFC 793 and RFC 768 of the Internet Engineering Task Force (IETF), which documents are incorporated herein by reference. The TCP or UDP packets at SGSN 52 are encapsulated by a GPRS tunneling protocol (GTP) layer for transmission to GGSN 54, preferably as specified by GSM standard 09.60, which is also incorporated herein by reference.

As described hereinabove with reference to FIG. 2A, the RLC/MAC layer provides reliable support for transmission of GSM-standard data packets generated by the upper-level networking functions of MS 40 (and SGSN 52) over the CDMA Layer 1 air interface between MS 40 and BSS 32. Mapping of GPRS LLC frames onto the CDMA physical channel, as well as access signaling procedures, are performed by the MAC function. BSS 32 uses the BSSGP layer to convey the information from the RLC/MAC layer to SGSN 52, which translates this information into IP data for transmission to GGSN 54. Lower layers L1 and L2 in SGSN 52 may comprise any suitable data communication protocols known in the art.

Although the communications protocol layers above are described generally with reference to functions required to adapt a signaling and data stream from MS 40 for transport to GPRS 50, it will be understood that the same protocol layers are also used to adapt signaling and data from GPRS 50 for transport to MS 40 and output by TE 46. The GPRS thus transmits and receives data to and from TE 36 via ME/MT 42 and BSS 32 as though MS 40 were operating in GSM/TDMA mode, substantially without regard to the fact that the data conveyed between the BSS and the MS are CDMA-encoded.

In a preferred embodiment of the present invention, when a data rate between TE 46 and ME/MT 42 exceeds CDMA traffic channel rates, a feature of IS-95 known as medium data rate (MDR) transmission is used to accommodate the excess data, under the control of the MAC function described hereinabove. In this case, MS 40 and BSS 32 open multiple traffic channels between them. Since there is frequently a greater volume of data being transported in one direction than in the other (most frequently in a forward direction, i.e., from BSS 32 to MS 40) the number of channels opened in the two directions need not be equal. For example, there may be four forward channels and only two reverse channels opened. In each direction, there is preferably one fundamental code traffic channel, which carries signaling (FIG. 2A) along with data, and up to seven supplemental code traffic channels for high-speed data. The fundamental channel is active substantially continuously, whereas the supplemental channels are activated as needed based on the total data rate at any time. The use of MDR for transmission of GSM high-speed circuit-switched data (HSCSD) is similarly described in the above-mentioned U.S. Patent Application entitled "Transmission of GSM Circuit- Switched Data over a CDMA Link."

Figure 3:
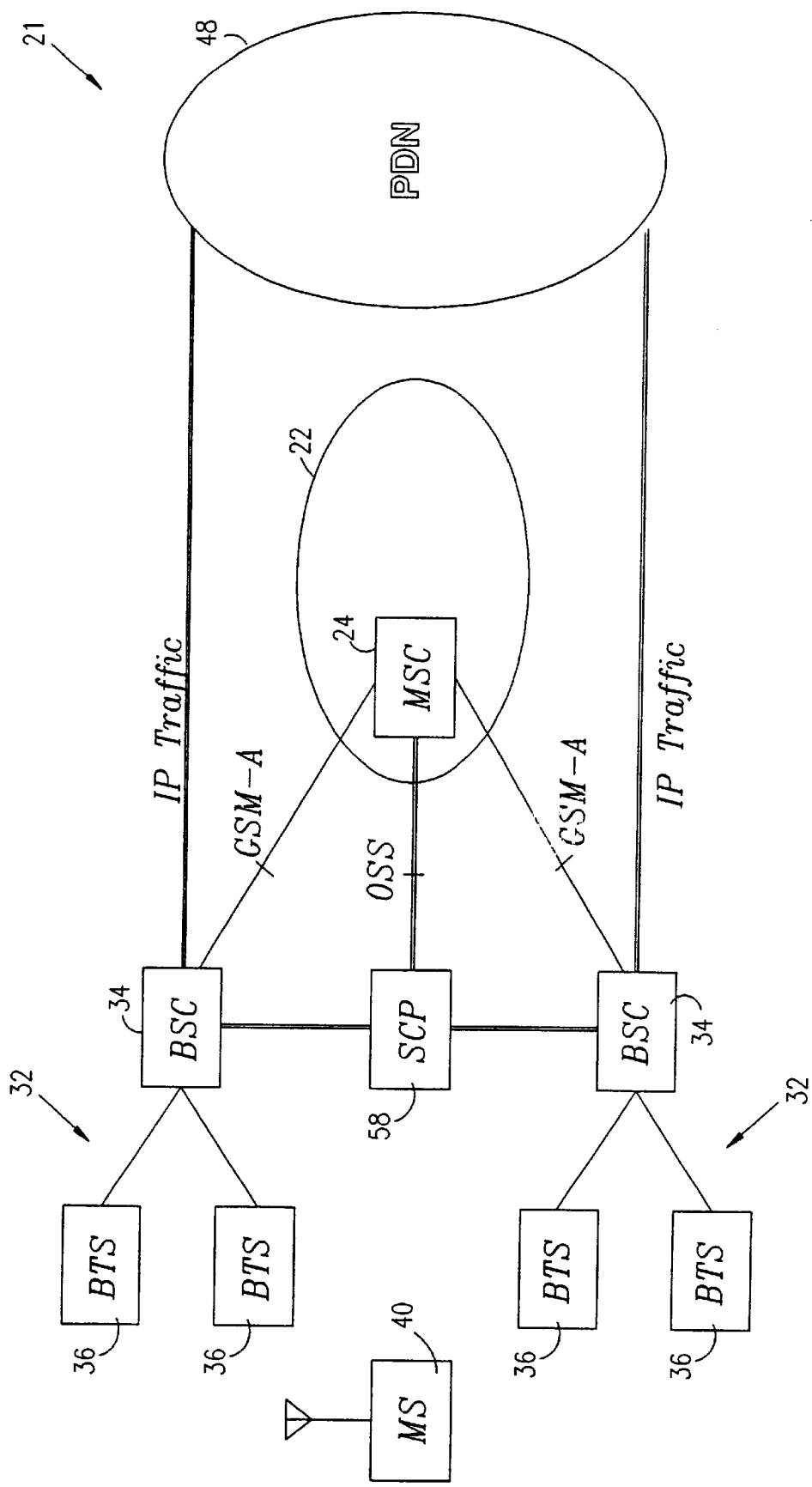
FIG. 3 is a schematic block diagram of a hybrid GSM/CDMA cellular communications system, in accordance with another preferred embodiment of the present invention.

FIG. 3 is a schematic block diagram illustrating a hybrid GSM/CDMA cellular communications system 21, in accordance with an alternative preferred embodiment of the present invention. System 21 is similar to system 20, shown in FIG. 1, except that in system 21, CDMA-standard data communications, preferably based on IS-707, are offered as a GSM operator-specific service, i.e., a packet data transfer service that is not specifically defined or supported by GSM network specification. In this case, packet data from MS 40, preferably in the form of IP data, are conveyed to PDN 48 directly by GSM-CDMA BSCs 34, rather than through GPRS 50. (System 21 may or may not include a GPRS, independent of the direct IP packet data link shown in FIG. 3.) PDN 48 preferably comprises the Internet or is connected to the Internet, although the architecture of system 21 may similarly be used to link MS 40 to other types of data networks known in the art, such as LANs, WANs and "intranets." The data are preferably conveyed between MS 40 and BSSs 32 in accordance with the IS-657 and IS-707 CDMA standards mentioned hereinabove.

A router associated with PDN 48 routes IP messages for MS 40 via whichever BSC 34 is in communication with the MS. Preferably, when MS 40 is handed over from one BSC to another, the PDN is informed of the handover and re-routes the IP messages to the new BSC based on the Mobile IP standard. The Mobile IP standard is defined in RFCs of the IETF, specifically including RFCs 2002, 2003 and 2004, which are incorporated herein by reference.

A GSM service node, known as a service control point (SCP) 58, communicates with BSCs 34 and with MSC 24 so as to enable the MSC to control access of MS 40 to system 21 and to handle network services, such as billing, in connection with the packet data transmission through the BSCs. SCP 58 communicates with MSC 24 via a GSM operator-specific service (OSS) interface. BSS 32 thus has several interfaces that are used to support data transfer between MS 40 and PDN 48:

CDMA air interface between BTS 36 and MS 40;

IP interface to PDN 48;

GSM A-interface to MSC 24; and a proprietary interface to SCP 58.

Figure 4:
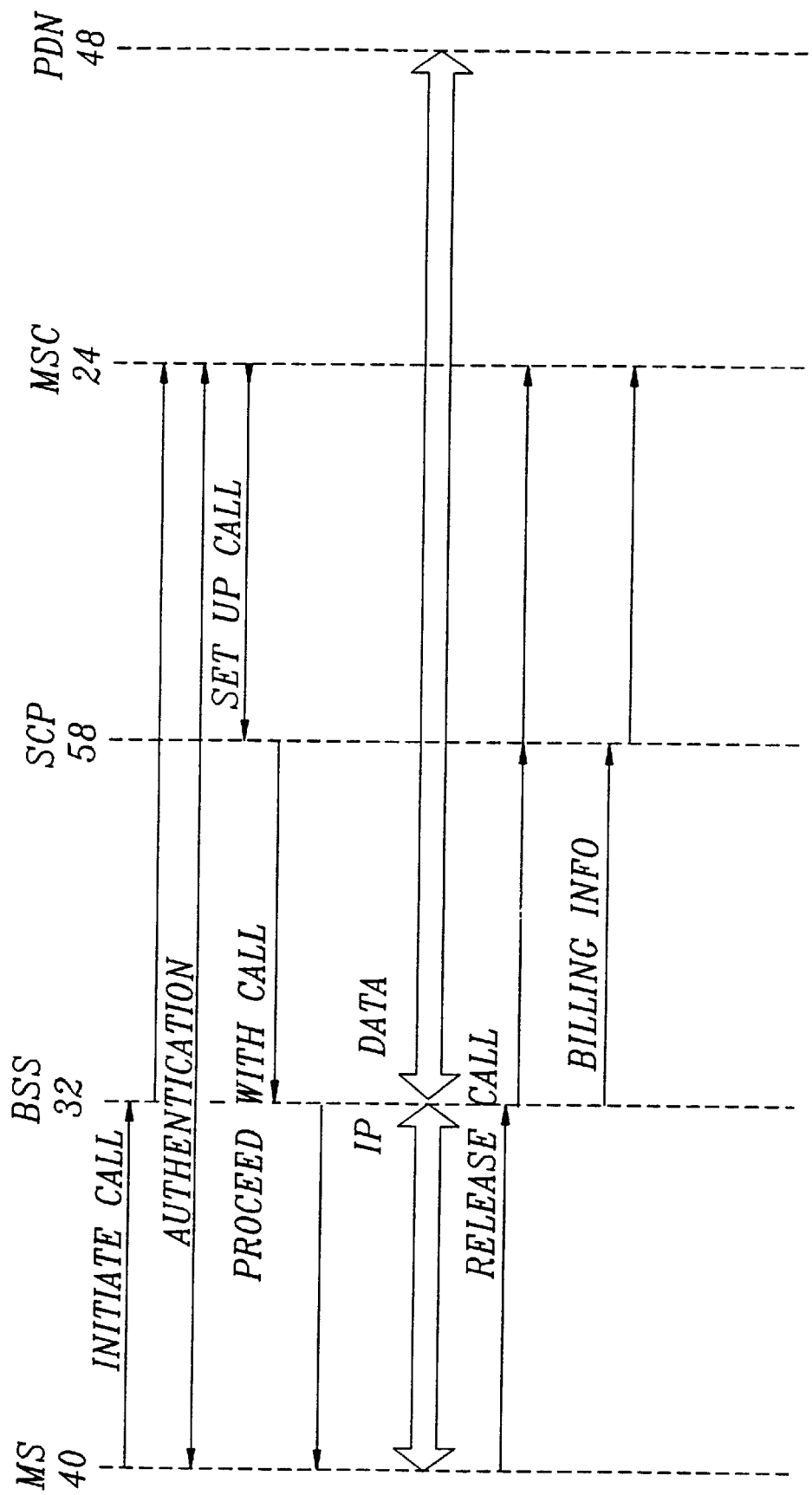
FIG. 4 is a schematic signaling diagram, illustrating communication procedures involving elements of the system of FIG. 3, in accordance with a preferred embodiment of the present invention.

FIG. 4 is a schematic signaling diagram, illustrating procedures involved between elements of system 21, shown in FIG. 3A, in conveying IP traffic between MS 40 and PDN 48, in accordance with a preferred embodiment of the present invention. When MS 40 has data to send, it initiates a GSM call to BSS 32, which accordingly contacts MSC 24 to request call initiation. MSC 24 authenticates MS 40 and sets a ciphering mode (if applicable), in accordance with GSM standards, and then consults SCP 58 in order to proceed with the call. The SCP then notifies BSS 32 that it is allowed to proceed with the call. At this point, the BSS allows MS 40 to send and receive IP data packets to and from MS 40, in accordance with IS-657 and IS-707, and conveys the packets to PDN 48, and back from the PDN to the MS.

When MS 40 has finished sending and receiving data, it notifies BSS 32, which accordingly sends a request to SCP 58 and/or MSC 24 to release the call. The BSS then transfers billing information relating to the call to SCP 58, which passes the information on to MSC 24 or directly to a billing system associated with PLMN 22.

In an alternative preferred embodiment of the present invention, SCP 58 communicates with MSC 24 via a GSM CAMEL (customized applications for mobile network enhanced logic) interface, rather than the OSS interface described hereinabove. CAMEL, although still in development, is intended to provide a standardized framework for such communications, in place of the proprietary OSS interface. CAMEL is defined in GSM standards 02.78, 03.78 and 09.78, which are incorporated herein by reference.

Figure 5:
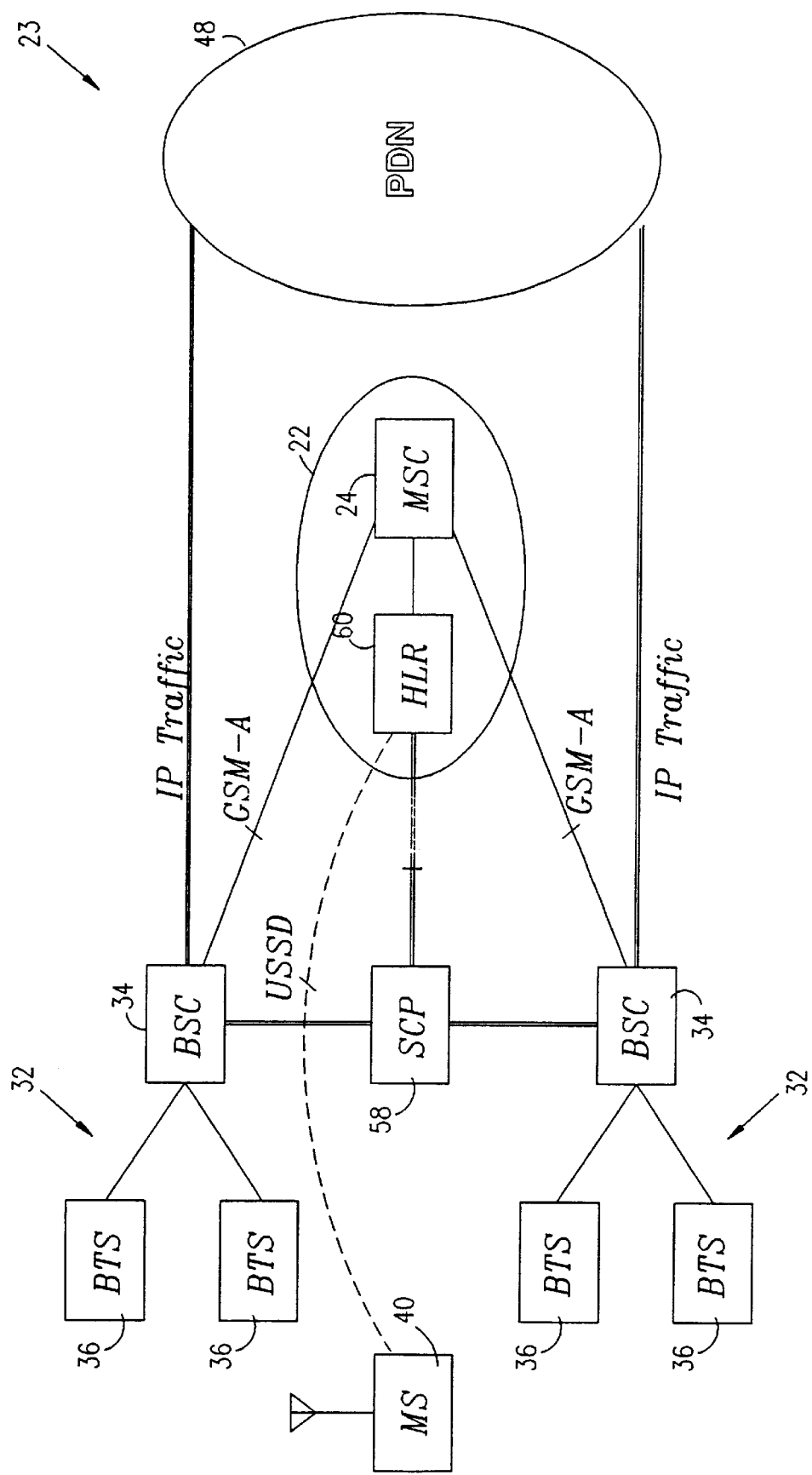
FIG. 5 is a schematic block diagram of a hybrid GSM/CDMA cellular communications system, in accordance with still another preferred embodiment of the present invention.

FIG. 5 schematically illustrates a hybrid GSM/CDMA cellular communications system 23 in accordance with still another preferred embodiment of the present invention. In system 23, BSCs 34 are linked to PDN 48 as shown in FIG. 3, but SCP 58 is linked and conveys service data to a home location register (HLR) 60 associated with PLMN 22, rather than to MSC 24. In this case, MS 40 conveys unstructured supplementary service data (USSD) to the HLR, as indicated by dashed lines in FIG. 5, and the HLR communicates with the SCP via a suitable proprietary interface.

Although preferred embodiments are described hereinabove with reference to a particular hybrid GSM/CDMA system, it will be appreciated that the principles of the present invention may similarly be applied to effect over-the-air data transfer in other hybrid communication systems, as well. Similarly, although the systems and methods described hereinabove make specific reference to IP packet data transfer, they may also be used for other modes and standards of data communications. The scope of the present invention encompasses not only the complete systems and communications processes described hereinabove, but also various innovative elements of these systems and processes, as well as combinations and sub-combinations thereof.

It will thus be appreciated that the preferred embodiments described above are cited by way of example, and the full scope of the invention is limited only by the claims.

What is claimed is:

1. A method for conveying packet data between a mobile station and a GSM network, comprising:
    (a) receiving within a base station subsystem, from the mobile station, communications over a code division multiple access (CDMA) air interface between the mobile station and the base station subsystem, wherein the base station subsystem includes a global system for mobility/code division multiple access (GSM-CDMA) radio link control layer in which operation is adapted to support a GSM general packet data service (GPRS) logic link control layer and general mobility management and session management protocol layer;
    (b) emulating within the GSM-CDMA radio link control layer the operation of a global system for mobility/time division multiple access (GSM-TDMA) radio link control layer in response to the received communications; and
    (c) providing communications between the base station subsystem and a GSM service node that performs general packet data service logic link control functions and general mobility management and session management protocol layer functions.

2. The method of claim 1, wherein communications between the base station subsystem and the GSM service node are via a GSM Gb interface.

3. The method of claim 1, further including the step of mapping GPRS frames onto the CDMA air interface.

4. The method of claim 1, further including the step of transferring data between the GSM service node and a public land mobile network as a GSM operator-specific service.

5. The method of claim 4, further including the step of communicating between the mobile station and a home location register via a GSM unstructured supplementary service data interface.

6. The method of claim 4, further comprising the step of handing over the mobile station from the base station to another base station and routing data to the other base station using Mobile IP.

7. The method of claim 1, wherein the step of providing communications between the base station subsystem and a GSM service node includes providing GSM authentication of the mobile station for a call made over the CDMA air interface.

8. The method of claim 1, wherein the data received over the air interface is received at a variable rate, responsive to the volume of the data received.

9. The method of claim 8, wherein data and signaling are received over a fundamental channel, and responsive to the volume of the received data, data is additionally received on one or more supplemental channels between the mobile station and the base station.

10. The method of claim 9, wherein the supplemental channels comprise a different number of channels in forward and reverse directions between the mobile station and the base station.

11. The method of claim 9, wherein one or more of the supplemental channels are closed in response to a decrease in rate at which the data is communicated between the mobile station and the base station subsystem.

12. The method of A method according to claim 1, wherein the data received from the mobile station is formatted in accordance with IS-657 and IS-707 CDMA packet data service.

13. A base station subsystem, comprising:
    (a) a receiver that from the mobile station, communications over a code division multiple access (CDMA) air interface between the mobile station and the base station subsystem;
    (b) a global system for mobility/code division multiple access (GSM-CDMA) radio link control layer in which operation is adapted to support a GSM general packet data service (GPRS) logic link control layer and general mobility management and session management protocol layer and which emulates the operation of a global system for mobility/time division multiple access (GSM-TDMA) radio link control layer in response to the received communications; and
    (c) a transceiver that provides communication between the base station subsystem and a GSM service node, wherein the GSM service node performs general packet data service logic link control functions and general mobility management and session management protocol layer functions.

14. A base station subsystem, comprising:
 (a) a receiver means for receiving from the mobile station, communications over a code division multiple access (CDMA) air interface between the mobile station and the base station subsystem;
 (b) a CDMA physical layer;
 (c) a radio link control layer means configured to operate with the CDMA physical layer and in which operation is adapted to support a GSM general packet data service (GPRS) logic link control layer and general mobility management and session management protocol layer and which emulates the operation of a global system for mobility/time division multiple access (GSM-TDMA) radio link control layer in response to the received communications; and
 (d) a transceiver means for providing communication between the base station subsystem and a GSM service node, wherein the GSM service node performs general packet data service logic link control functions and general mobility management and session management protocol layer functions.

* * * * *